(12) United States Patent
Chen

(10) Patent No.: US 11,787,566 B2
(45) Date of Patent: Oct. 17, 2023

(54) DRONE AND BATTERY EXCHANGE SYSTEM THEREOF

(71) Applicant: Teco Image Systems Co., Ltd., New Taipei (TW)

(72) Inventor: Ting-Chun Chen, New Taipei (TW)

(73) Assignee: TECO IMAGE SYSTEMS CO., LTD., New Taipei (TW)

( * ) Notice: Subject to any disclaimer, the term of this patent is extended or adjusted under 35 U.S.C. 154(b) by 320 days.

(21) Appl. No.: 17/135,095

(22) Filed: Dec. 28, 2020

(65) Prior Publication Data

US 2022/0194630 A1 Jun. 23, 2022

(30) Foreign Application Priority Data

Dec. 18, 2020 (TW) .................................. 109145032

(51) Int. Cl.
*B64F 5/50* (2017.01)
*B64C 39/02* (2023.01)
*B64F 5/40* (2017.01)
*B64U 10/13* (2023.01)
*B64U 50/19* (2023.01)

(52) U.S. Cl.
CPC .............. *B64F 5/50* (2017.01); *B64C 39/024* (2013.01); *B64F 5/40* (2017.01); *B64U 10/13* (2023.01); *B64U 50/19* (2023.01)

(58) Field of Classification Search
CPC . B64F 5/50; B64F 5/40; B64C 39/024; B64U 10/13; B64U 50/19
See application file for complete search history.

(56) References Cited

U.S. PATENT DOCUMENTS 4,187,779 A * 2/1980 Jones ........................ F42C 5/00
102/209
6,057,608 A * 5/2000 Bailey, Jr. ........... H01M 50/213
307/64

(Continued)

FOREIGN PATENT DOCUMENTS

CN 205564859 U 9/2016
CN 106516138 A 3/2017

(Continued)

OTHER PUBLICATIONS

US 11,584,253 B2, 02/2023, Zhang (withdrawn)*

*Primary Examiner* — Medhat Badawi
(74) *Attorney, Agent, or Firm* — KIRTON McCONKIE; Evan R. Witt

(57) ABSTRACT

A drone includes a frame and a battery. The frame has a battery accommodation groove. The battery accommodation groove includes a first positioning component and a second positioning component. The first positioning component and the second positioning component are staggered along a first direction. The battery is received within the battery accommodation groove. The battery has a first positioning portion and a second positioning portion. The first positioning portion is matched with the first positioning component, and the second positioning portion is matched with the second positioning component. Therefore, an automatic exchange of batteries along the first direction can be implemented, and the advantages of reducing costs of space, time, and manpower can be achieved.

6 Claims, 12 Drawing Sheets

(56) References Cited

U.S. PATENT DOCUMENTS

| | | | | |
|---|---|---|---|---|
| 8,146,694 | B2* | 4/2012 | Hamidi | B60L 53/80 180/68.5 |
| 9,434,267 | B2* | 9/2016 | Wang | B64D 27/24 |
| 9,873,408 | B2* | 1/2018 | Capizzo | B60L 53/66 |
| 11,548,403 | B2* | 1/2023 | Wood | G06Q 50/30 |
| 11,565,801 | B2* | 1/2023 | Tal | B64C 27/50 |
| 2003/0035284 | A1* | 2/2003 | Maglica | F21V 23/0414 362/202 |
| 2005/0172506 | A1* | 8/2005 | Collingwood | B23Q 1/0009 33/561 |
| 2010/0181129 | A1* | 7/2010 | Hamidi | B60L 53/80 180/68.5 |
| 2010/0288569 | A1* | 11/2010 | Fish | B60K 15/07 180/65.21 |
| 2011/0231035 | A1* | 9/2011 | Houde-Walter | G01S 17/74 250/206 |
| 2012/0083945 | A1* | 4/2012 | Oakley | B64C 25/52 701/2 |
| 2013/0256464 | A1* | 10/2013 | Belik | B64D 9/00 244/4 R |
| 2016/0039300 | A1* | 2/2016 | Wang | B64D 27/24 244/58 |
| 2017/0283090 | A1* | 10/2017 | Miller | B64C 39/024 |
| 2017/0327091 | A1* | 11/2017 | Capizzo | C25B 9/17 |
| 2018/0281919 | A1* | 10/2018 | Tian | B64C 1/069 |
| 2019/0071180 | A1* | 3/2019 | Qiu | B64C 27/50 |
| 2019/0135424 | A1* | 5/2019 | Baity | B64C 39/10 |
| 2019/0185169 | A1* | 6/2019 | Xu | H01M 10/0587 |
| 2019/0248502 | A1* | 8/2019 | Tang | B64C 39/024 |
| 2019/0315235 | A1* | 10/2019 | Kung | B64C 39/024 |
| 2020/0283118 | A1* | 9/2020 | Lin | B64D 47/00 |
| 2021/0031915 | A1* | 2/2021 | Rose | B60L 53/80 |
| 2021/0053679 | A1* | 2/2021 | Johannesson | B64C 39/024 |
| 2021/0163120 | A1* | 6/2021 | Jarvis | B64C 39/024 |
| 2021/0197977 | A1* | 7/2021 | Jenkins | B64U 10/13 |
| 2021/0309388 | A1* | 10/2021 | Ratajczak | B64D 31/00 |
| 2021/0376414 | A1* | 12/2021 | Yang | B64C 39/024 |
| 2022/0194630 | A1* | 6/2022 | Chen | B64F 5/50 |

FOREIGN PATENT DOCUMENTS

| | | |
|---|---|---|
| CN | 206123109 U | 4/2017 |
| CN | 108569262 A | 9/2018 |
| CN | 111169437 A | 5/2020 |
| CN | 111891374 A | 11/2020 |
| CN | 211957723 U | 11/2020 |

\* cited by examiner

DRONE AND BATTERY EXCHANGE SYSTEM THEREOF

CROSS-REFERENCE TO RELATED APPLICATION

This application claims priority from Taiwan Patent Application No. 109145032, filed on Dec. 18, 2020, the entire contents of which are incorporated herein by reference for all purposes.

FIELD OF THE INVENTION

The present invention relates to a drone, and more particularly to a drone and a battery exchange system thereof.

BACKGROUND OF THE INVENTION

In recent years, accompanying with the improvement of computing chips and the evolution of motor power, many transportation equipment, such as electric vehicles, electric motorcycle, electric scooters, and electric drones, have been developed and applied to the market. In general, the drone technology is an extension of traditional fuel technology. However, due to the large volume and high temperature of fuel equipment, it is dangerous and costly to reduce the size. It is not suitable for commercial use or urban use.

The fuel equipment can be replaced by batteries in electric drones for providing power, and the complex transmission mechanism used in the traditional drones can be replaced by motors. As a result, the size of drones can be effectively reduced so as to be applied to urban transportation or commercial transportation.

However, the existing electric drones have problems of endurance. Relying on the energy of a single battery, only the power of a short time operation can be provided to an existing drone. Since the battery energy density cannot be significantly increased, if additional batteries are carried by a drone, the weight ratio of the drone will be affected, and the efficiency of the load will be reduced. In addition, the batteries of most of the existing drones must be replaced manually, and enough space is necessary for the battery exchange operations, so high costs of space, time, and manpower cannot be avoided.

Therefore, there is a need of providing a drone and a battery exchange system thereof distinct from prior art in order to solve the above drawbacks.

SUMMARY OF THE INVENTION

Some embodiments of the present invention are to provide a drone and a battery exchange system thereof in order to overcome at least one of the above-mentioned drawbacks encountered by prior art.

The present invention provides a drone and a battery exchange system thereof. By staggering the first positioning component and the second positioning component along the first direction and coupling the first positioning portion and the second positioning portion with the first positioning component and the second positioning component, an automatic exchange of batteries along the first direction can be implemented, and the advantages of reducing costs of space, time, and manpower can be achieved.

The present invention also provides a drone and a battery exchange system thereof. Through the cooperation of a battery rail penetrating the drone and a positioning mechanism, an automatically unidirectional or bidirectional battery exchange can be implemented. Meanwhile, with drone dispatch systems, island-hopping flights of drones can be implemented, thereby facilitating long-distance and continuous transportation.

In accordance with an aspect of the present invention, there is provided a drone. The drone includes a frame and a battery. The frame has a battery accommodation groove. The battery accommodation groove includes a first positioning component and a second positioning component. The first positioning component and the second positioning component are staggered along a first direction. The battery is received within the battery accommodation groove. The battery has a first positioning portion and a second positioning portion. The first positioning portion is matched with the first positioning component, and the second positioning portion is matched with the second positioning component.

In accordance with another aspect of the present invention, there is provided a battery exchange system of a drone. The battery exchange system includes a plurality of batteries, at least one drone, and a battery exchange station. Each of the drone includes a frame and one battery of the plurality of batteries. The frame has a battery accommodation groove and a guide rail. The guide rail is disposed in the battery accommodation groove. The one battery is changeably received within the battery accommodation groove along a first direction or a reverse direction of the first direction. The battery exchange station includes a transportation rail. A part of the plurality of batteries are stored in the battery exchange station. When the drone is landed on the battery exchange station, the transportation rail is engaged with the guide rail, and one battery of the part of the plurality of batteries stored in the battery exchange station is transported to the battery accommodation groove along the first direction or the reverse direction of the first direction by the transportation rail.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
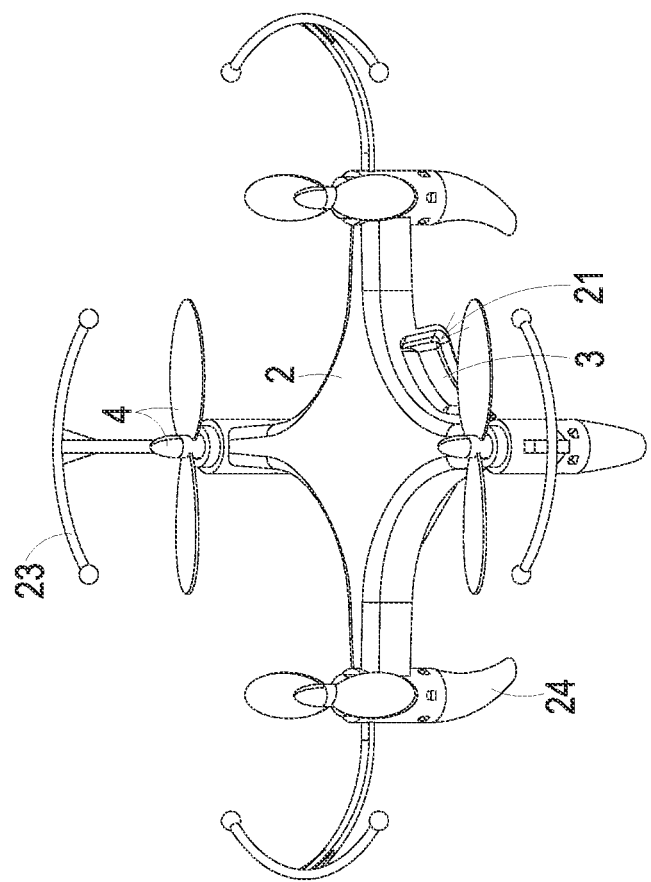
FIG. 1 schematically illustrates a structure of a drone according to an embodiment of the present invention.
Figure 2:
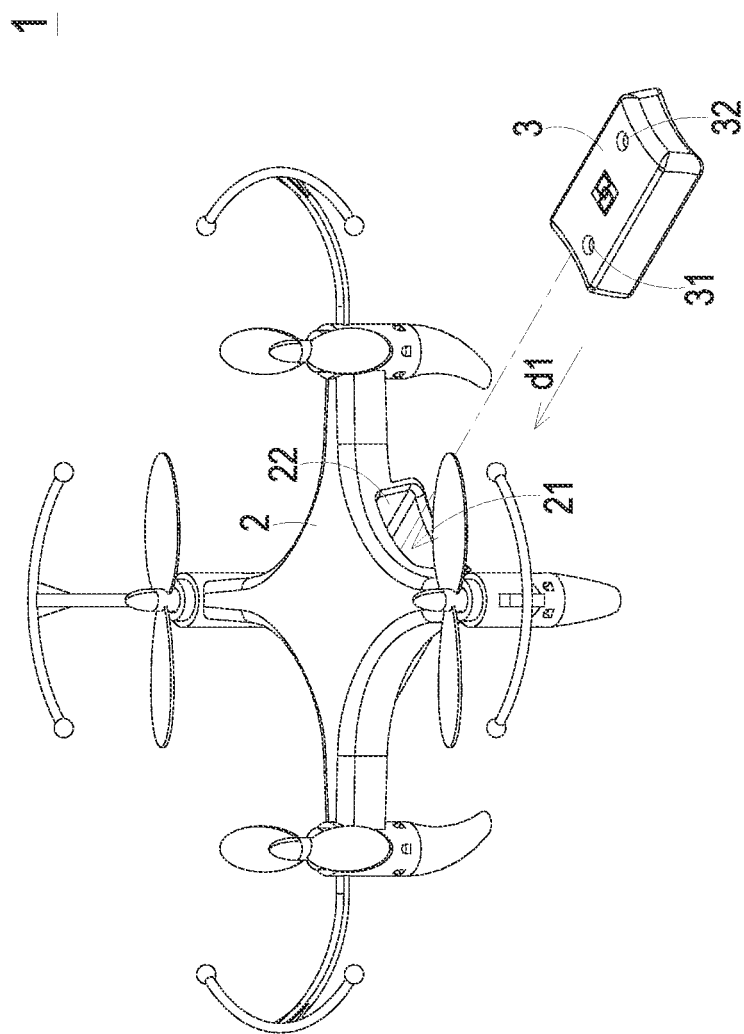
FIG. 2 schematically illustrates a battery of a drone of the present invention changeably received within a battery accommodation groove along a first direction.
Figure 3:
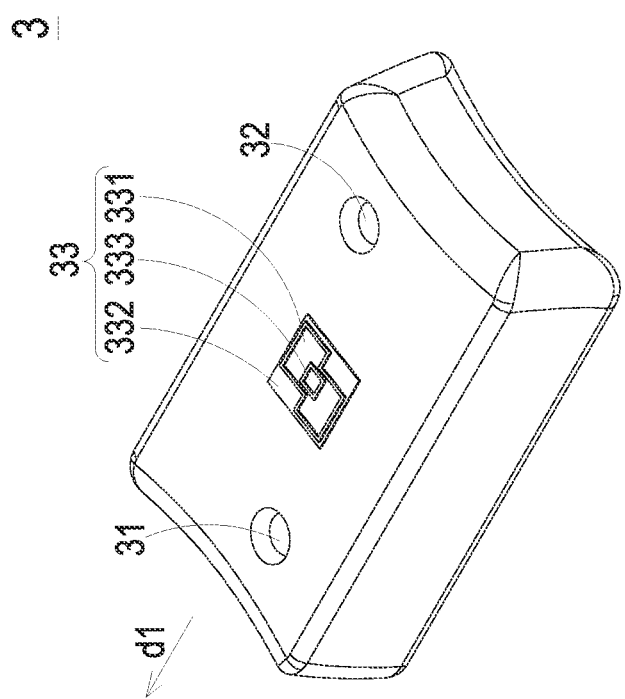
FIG. 3 schematically illustrates a structure of a battery of a drone according to an embodiment of the present invention.
Figure 4:
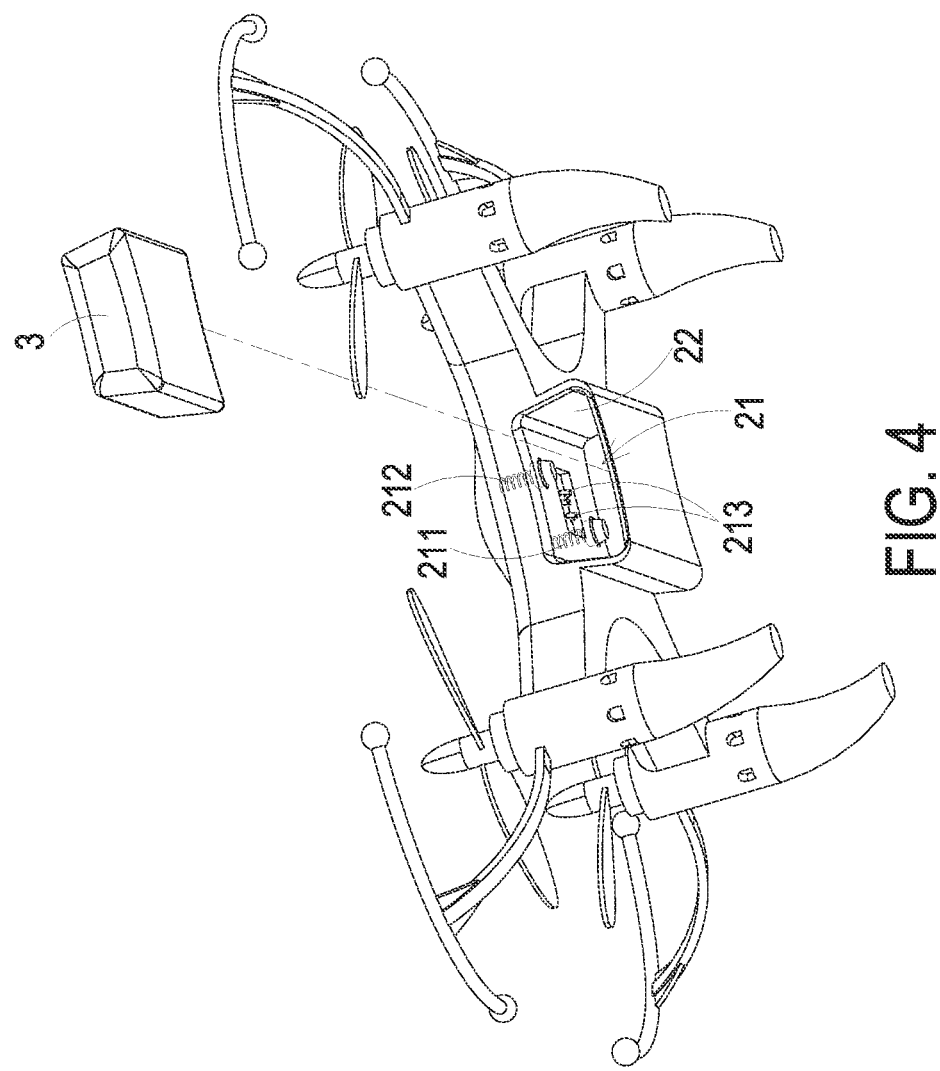
FIG. 4 schematically illustrates another view of a battery of a drone of the present invention changeably received within a battery accommodation groove along a first direction.

Please refer to FIG. 1, FIG. 2, FIG. 3, and FIG. 4. FIG. 1 schematically illustrates a structure of a drone according to an embodiment of the present invention. FIG. 2 schematically illustrates a battery of a drone of the present invention changeably received within a battery accommodation groove along a first direction. FIG. 3 schematically illustrates a structure of a battery of a drone according to an embodiment of the present invention. FIG. 4 schematically illustrates another view of a battery of a drone of the present invention changeably received within a battery accommodation groove along a first direction. According to an embodiment of the present invention, a drone 1 includes a frame 2 and a battery 3. The frame 2 has a battery accommodation groove 21. The battery accommodation groove 21 includes a first positioning component 211 and a second positioning component 212. The first positioning component 211 and the second positioning component 212 are staggered along a first direction d1. In other words, the first positioning component 211 and the second positioning component 212 are not overlapped on the first direction d1. The battery 3 is received within the battery accommodation groove 21. The battery 3 has a first positioning portion 31 and a second positioning portion 32. The first positioning portion 31 and the second positioning portion 32 are staggered along the first direction d1, which means that the first positioning portion 31 and the second positioning portion 32 are not overlapped on the first direction d1. The first positioning portion 31 is matched with the first positioning component 211, and the second positioning portion 32 is matched with the second positioning component 212.

In some embodiments, the first positioning portion 31 is coupled, engaged, or latched with the first positioning component 211, and the second positioning portion 32 is coupled, engaged, or latched with the second positioning component 212, but not limited herein.

In brief, by staggering the first positioning component 211 and the second positioning component 212 along the first direction d1 and matching the first positioning portion 31 and the second positioning portion 32 with the first positioning component 211 and the second positioning component 212, an automatic exchange of batteries along the first direction d1 can be implemented, and the advantages of reducing costs of space, time, and manpower can be achieved.

In addition, the fact that the first positioning portion 31 is matched with the first positioning component 211 means the first positioning portion 31 is disposed corresponding to the first positioning component 211, and the first positioning portion 31 and the first positioning component 211 can be in contact with each other for positioning. Similarly, the fact that the second positioning portion 32 is matched with the second positioning component 212 means the second positioning portion 32 is disposed corresponding to the second positioning component 212, and the second positioning portion 32 and the second positioning component 212 can be in contact with each other for positioning.

In some embodiments, the battery 3 of the drone 1 of the present invention is preferred to be received within the battery accommodation groove 21 along a first direction d1 or a reverse direction of the first direction d1, and the frame 2 of the drone 1 is preferred to have a guide rail 22 disposed in the battery accommodation groove 21 along the first direction d1, but not limited herein. Based on this structure, the battery 3 can be guided by the guide rail 22 to slide into the battery accommodation groove 21 along the first direction d1, and accommodated in the battery accommodation groove 21, but not limited herein.

Please refer to FIG. 1 and FIG. 2 again. In some embodiments, the drone 1 of the present invention further includes a plurality of airflow disturbance devices 4. The airflow disturbance devices 4 are installed on the frame 2 to disturb airflow for providing pushing force to drive the drone 1. In addition, the frame 2 further has a plurality of protective components 23 and a plurality of supporting feet 24 in some embodiments. The protective components 23 are farther away from a center of the drone relative to the supporting feet 24, and the protective components 23 are one-to-one disposed outside the airflow disturbance devices 4 for protecting the airflow disturbance devices 4. The supporting feet 24 is preferred to be one-to-one disposed under the airflow disturbance devices 4 for supporting the airflow disturbance devices 4 and providing the drone 1 with the ability to stand when it is not flying.

Please refer to FIG. 3 again. As shown in FIG. 3, the first positioning portion 31 and the second positioning portion 32 of the battery 3 are symmetric relative to a center of the battery 3, and preferably are point-symmetric or line-symmetric with each other. In particular, the symmetric point of the point-symmetry is the center of the battery 3, and the symmetric line of the line-symmetry is the diagonal line of the battery 3. In some embodiments, the battery 3 has an electrode region 33. The electrode region 33 has at least one positive electrode 331, at least one negative electrode 332, and at least one identification component 333. The positive electrode 331, the negative electrode 332, and the identification component 333 are overlapped with each other or separately disposed with each other, but not limited herein.

Figure 5:
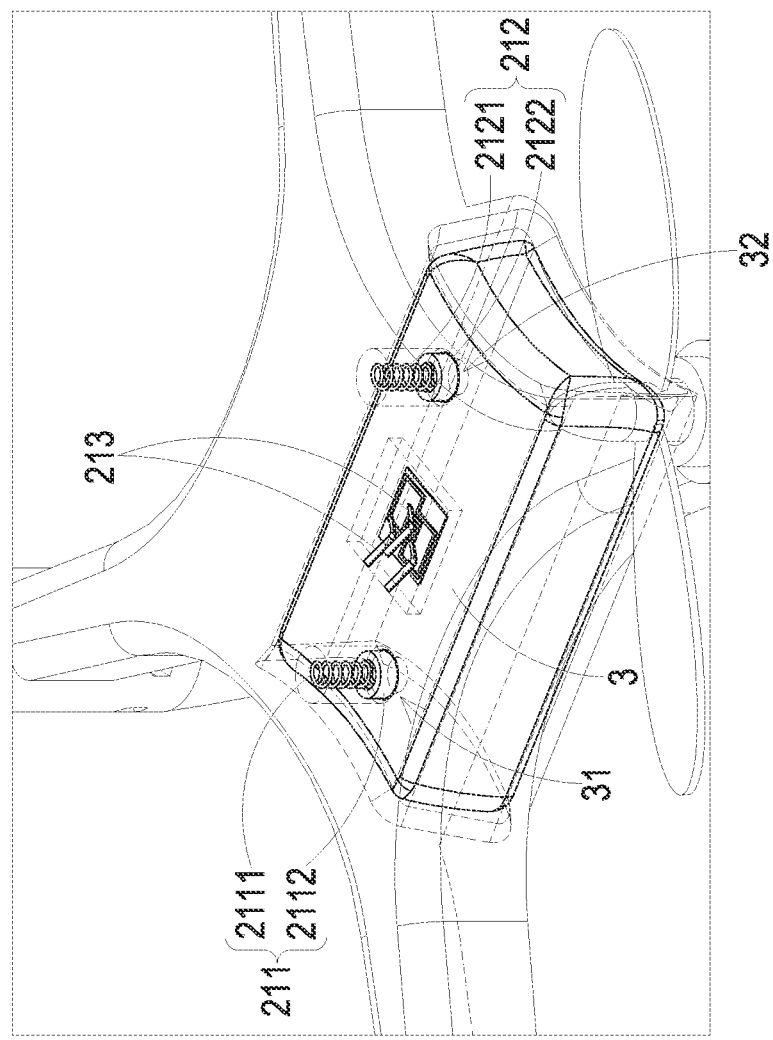
FIG. 5 schematically illustrates a perspective view of a detailed structure of a battery and a battery accommodation groove of a frame of a drone of the present invention.

The mechanical relationship between the first positioning component 211 and the second positioning component 212 of the battery accommodation groove 21 of the frame 2 and the first positioning portion 31 and the second positioning portion 32 of the battery 3 of the drone 1 of the present invention are described as follows. Please refer to FIG. 5. FIG. 5 schematically illustrates a perspective view of a detailed structure of a battery and a battery accommodation groove of a frame of a drone of the present invention. As shown in FIG. 5, the first positioning component 211 includes a first spring 2111 and a first conical frustum 2112, the second positioning component 212 includes a second spring 2121 and a second conical frustum 2122. Each of the first positioning portion 31 and the second positioning portion 32 is a recess. When the battery 3 is received by the battery accommodation groove 21, the first spring 2111 provides elasticity to make the first conical frustum 2112 be received within the first positioning portion 31 and abutted against the first positioning portion 31, and the second spring 2121 provides elasticity to make the second conical frustum 2122 be received within the second positioning portion 32 and abutted against the second position portion 32, so that the first conical frustum 2112 and the second conical frustum 2122 are respectively fixed and positioned with the first positioning portion 31 and the second positioning portion 32.

Since the first positioning component 211 and the second positioning component 212, and the first positioning portion 31 and the second positioning portion 32, are staggered along the first direction d1, none of a wrong positioning will be occurred when the battery 3 is guided to slide into the battery accommodation groove 21 along the first direction d1. Meanwhile, based on the symmetric relationship between the first positioning portion 31 and the second positioning portion 32 of the battery 3, whether the battery 3 enters the battery accommodation groove 21 along the first direction d1 or the reverse direction of the first direction d1, the battery 3 can be effectively positioned to the correct position.

In some embodiments, an end of the first spring 2111 which is closer to the battery 3 is connected to the first conical frustum 2112. A surface of the first conical frustum 2112 which is closer to the first spring 2111 has a greater diameter while the other surface of the first conical frustum 2112 which is closer to the battery 3 has a smaller diameter. Similarly, an end of the second spring 2121 which is closer to the battery 3 is connected to the second conical frustum 2122. A surface of the second conical frustum 2122 which is closer to the second spring 2121 has a greater diameter while the other surface of the second conical frustum 2122 which is closer to the battery 3 has a smaller diameter.

In addition, the batter accommodation groove 21 includes a plurality of metal plate springs 213. When the battery 3 is received by the battery accommodation groove 21, the plate springs 213 are respectively abutted against the positive electrode 331, the negative electrode 332, and the identification component 333, thereby providing electric connections between the battery 3 and the inner circuit of the drone 1. In some embodiments, the identification component 333 is an identification resistor or an identification chip, but not limited herein.

Figure 6:
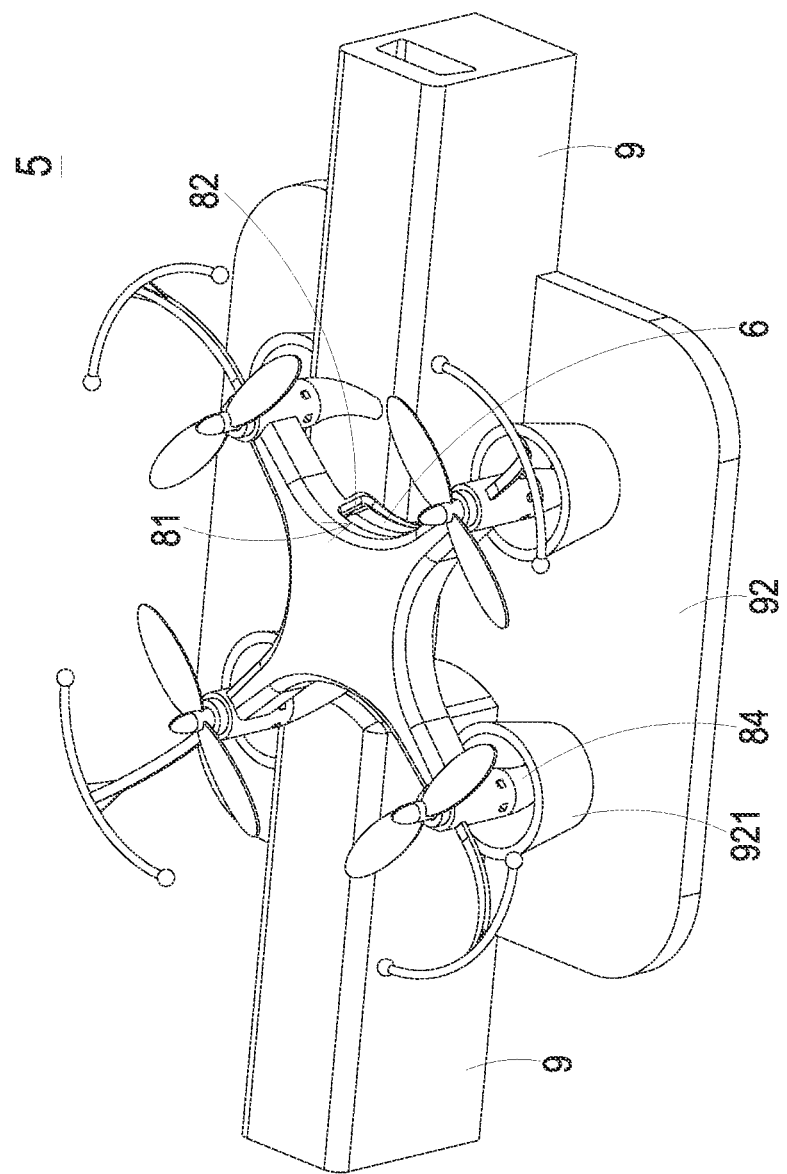
FIG. 6 schematically illustrates a structure of a battery exchange system according to an embodiment of the present invention.
Figure 7:
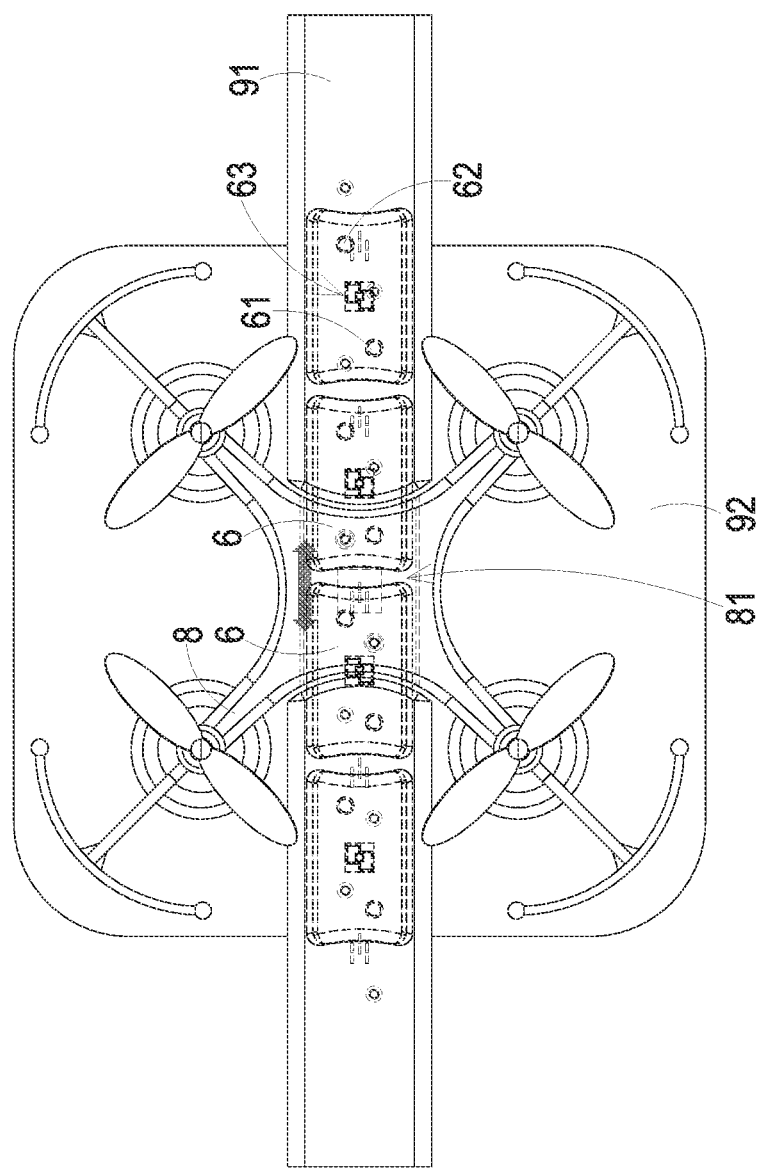
FIG. 7 schematically illustrates a top view with partially perspective view of the battery exchange system shown in FIG. 6.
Figure 8:
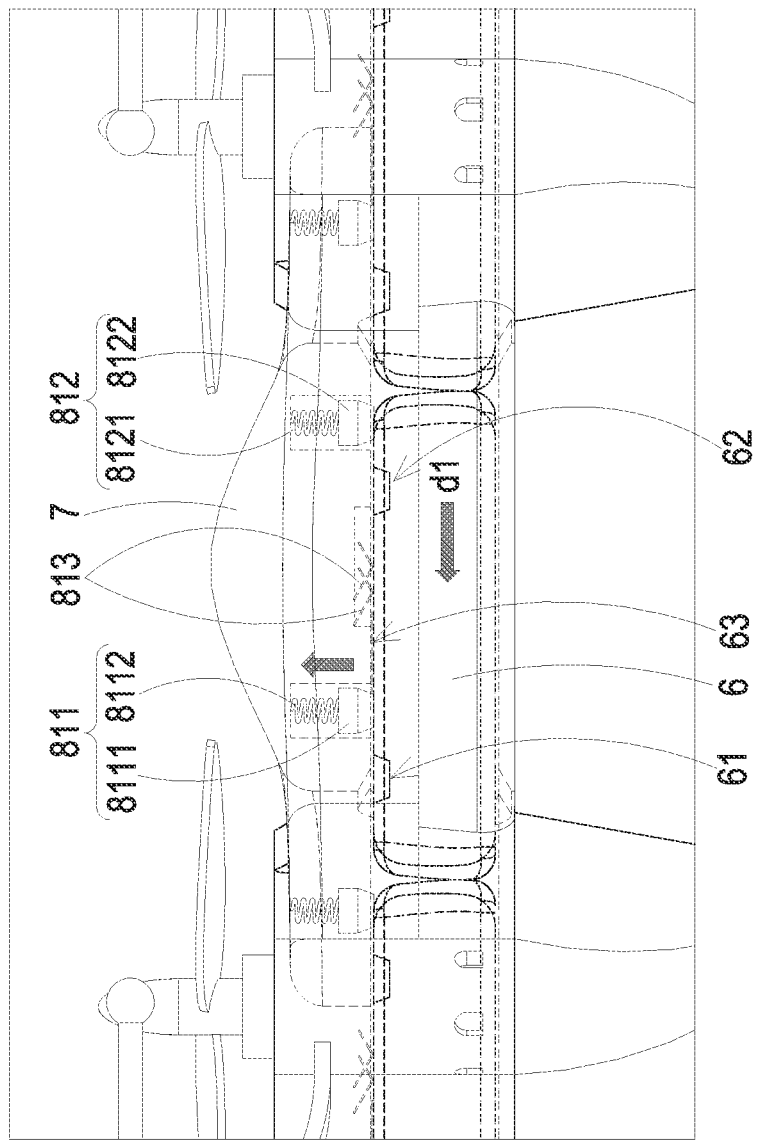
FIG. 8 schematically illustrates a side view with partially perspective view of the battery exchange system shown in FIG. 6.

Please refer to FIG. 6, FIG. 7, and FIG. 8. FIG. 6 schematically illustrates a structure of a battery exchange system according to an embodiment of the present invention. FIG. 7 schematically illustrates a top view with partially perspective view of the battery exchange system shown in FIG. 6. FIG. 8 schematically illustrates a side view with partially perspective view of the battery exchange system shown in FIG. 6. As shown in FIG. 6, FIG. 7, and FIG. 8, according to an embodiment of the present invention, a battery exchange system 5 includes a plurality of batteries 6, at least one drone 7 and a battery exchange station 9. Each of the drone 7 includes a frame 8 and one battery 6 of the plurality of batteries 6. The frame 8 has a battery accommodation groove 81 and a guide rail 82. The guide rail 82 is disposed in the battery accommodation groove 81. The battery 6 is changeably received within the battery accommodation groove 81 along a first direction d1 or a reverse direction of the first direction d1. A part of the plurality of batteries 6 are stored in the battery exchange station 9. The battery exchange station 9 includes a transportation rail 91. When the drone 7 is landed on the battery exchange station 9, the transportation rail 91 is engaged with the guide rail 82, and one battery 6 of the part of the plurality of batteries 6 stored in the battery exchange station 9 is transported to the battery accommodation groove 82 along the first direction d1 or the reverse direction of the first direction d1 by the transportation rail 91.

It should be noted that the structure of the drone 7 of the battery exchange system 5 of the present invention may include a battery 6 which is replaceable for providing power of motor and a fixed battery (not shown) installed inside the frame 71 for providing power of computing. A small power-consuming system, such as a flight control computer, can be continuously powered by the fixed battery for a long time. When a rapid battery exchange provided by the present invention is performing, only the battery 6 which is replaceable is exchanged with a fully charged one from the battery exchange station 9 for providing the power of flying, which means that the flight mission will not be interrupted during the battery exchange.

In this embodiment, the transportation rail 91 of the battery exchange station 9 and the guide rail 82 of the frame 8 of the drone 7 are engaged as a strip-shaped rail. The transportation rail 82 has a plurality of charging slots, and each of the batteries 6 stored in the battery exchange station 9 is disposed in one charging slot of the plurality of charging slots. A number of the charging slots is twice the number of the batteries 6 stored in the battery exchange station 9. As a result, when a system of the drone 7 judges that the power of the battery 6 installed in the drone 7 is not enough for the drone 7 to complete the flight mission, the drone 7 will find a nearest battery exchange station for landing. When the drone 7 is landed on the battery exchange station 9, the transportation rail 91 will be engaged with the guide rail 82 and a strip-shaped rail will be formed. Since this structure provides a unidirectional or a bidirectional battery exchange along the first direction d1 and/or the reverse direction of the first direction d1, the number of the charging slots must be twice the number of the batteries 6, so that the number of the charging slots are enough to store and charge all the batteries 6 when the batteries 6 are all transported to the same side.

Please refer to FIG. 8 again. As shown in FIG. 8, when the battery 6 is transported along the first direction d1 by the transportation rail 91, the battery installed in the drone 7 is pushed, and then a first conical frustum 8112 of a first positioning component 811 of the battery accommodation groove 81 and a second conical frustum 8122 of a second positioning component 812 of the battery accommodation groove 81 are pushed (along the first direction). Considering with the structures of the first conical frustum 8112 and the second conical frustum 8122, the first spring 8111 and the second spring 8121 are raised until the to-be-installed one of the batteries 6 is pushed to a location where the first positioning portion 61 is located under the first spring 8111 and the first conical frustum 8112 and the second positioning portion 62 is located under the second spring 8121 and the second conical frustum 8122. The recovery forces provided by the first spring 8111 and the second spring 8121 will push the first conical frustum 8112 and the second conical frustum 8122 to couple with and abut against the first positioning portion 61 and the second positioning portion 62, thereby completing the battery exchange. Simultaneously, a plurality of metal plate springs 813 of the battery accommodation groove 81 are abutted against an electrode region 63 of the battery 6.

Figure 9:
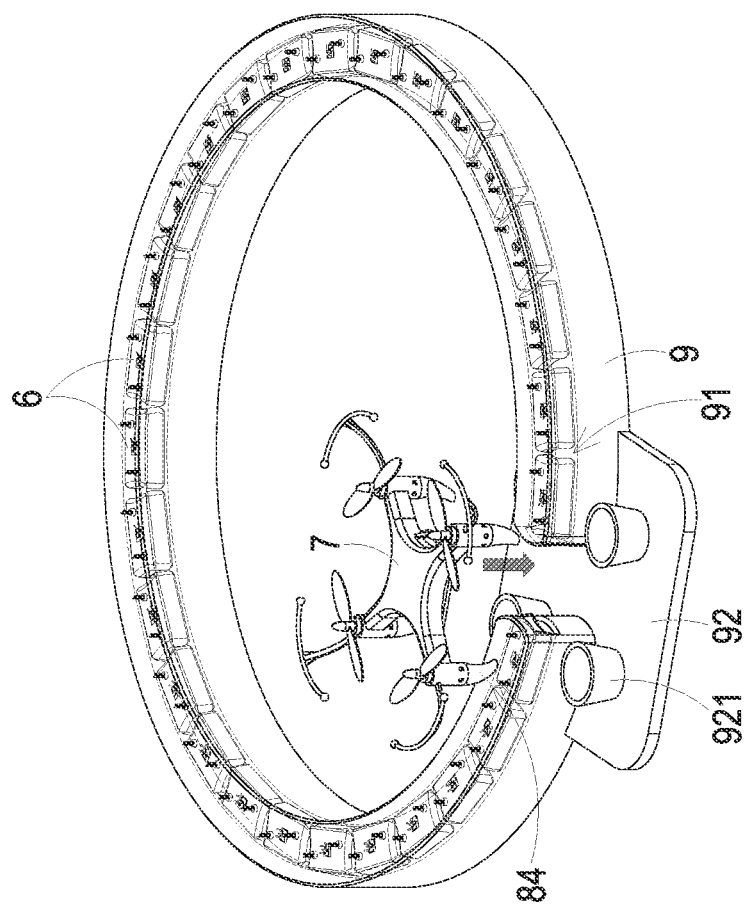
FIG. 9 schematically illustrates a drone of a battery exchange system according to an embodiment of the present invention landed on a battery exchange station.
Figure 10:
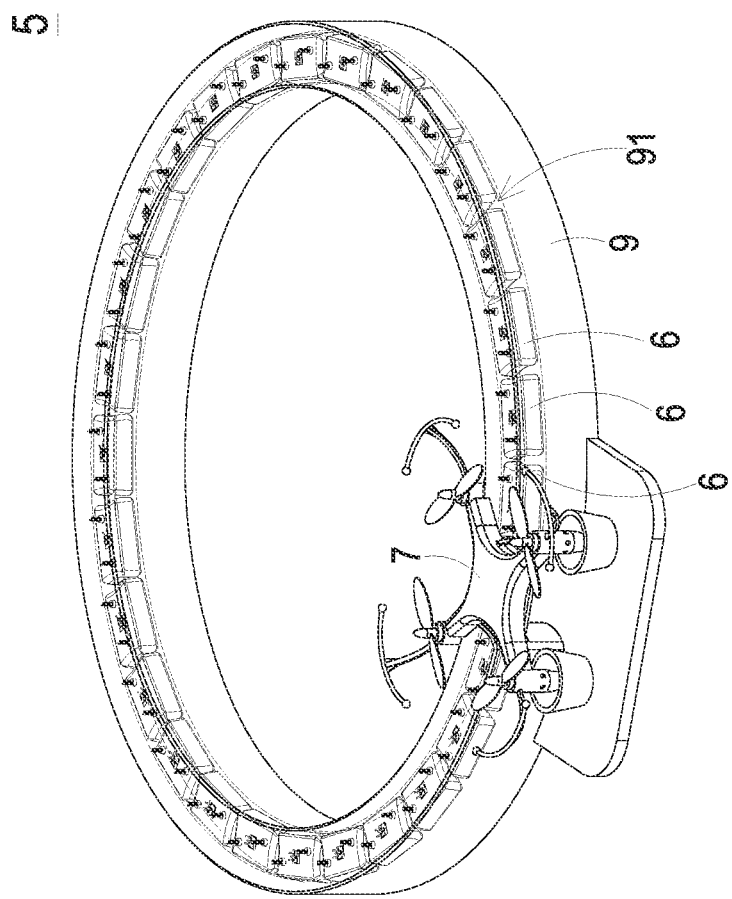
FIG. 10 schematically illustrates a structure of a battery exchange system according to an embodiment of the present invention.
Figure 11:
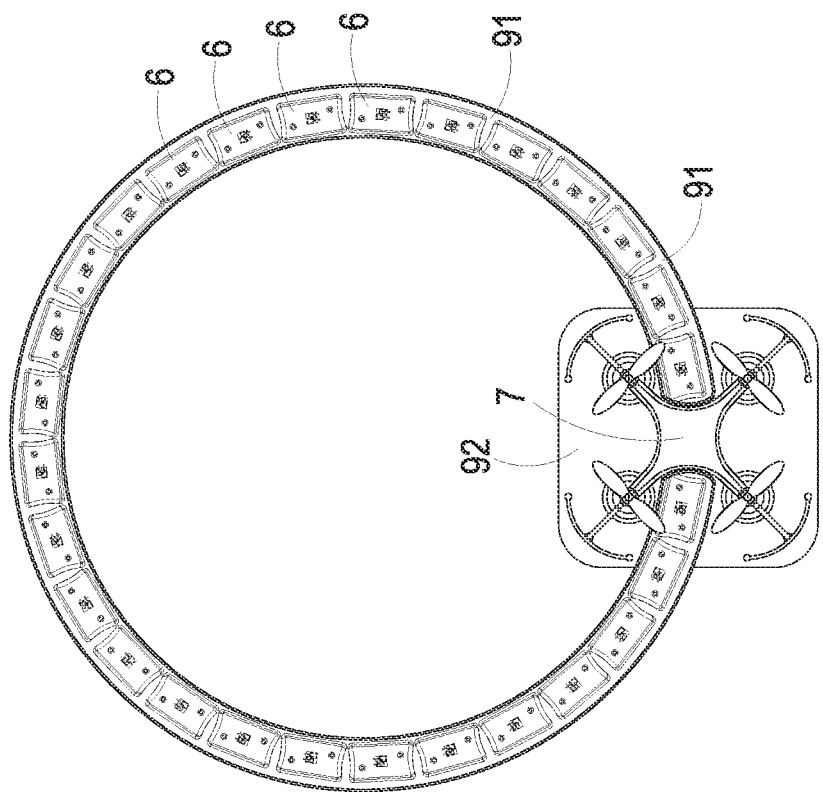
FIG. 11 schematically illustrates a top view of the battery exchange system shown in FIG. 10.
Figure 12:
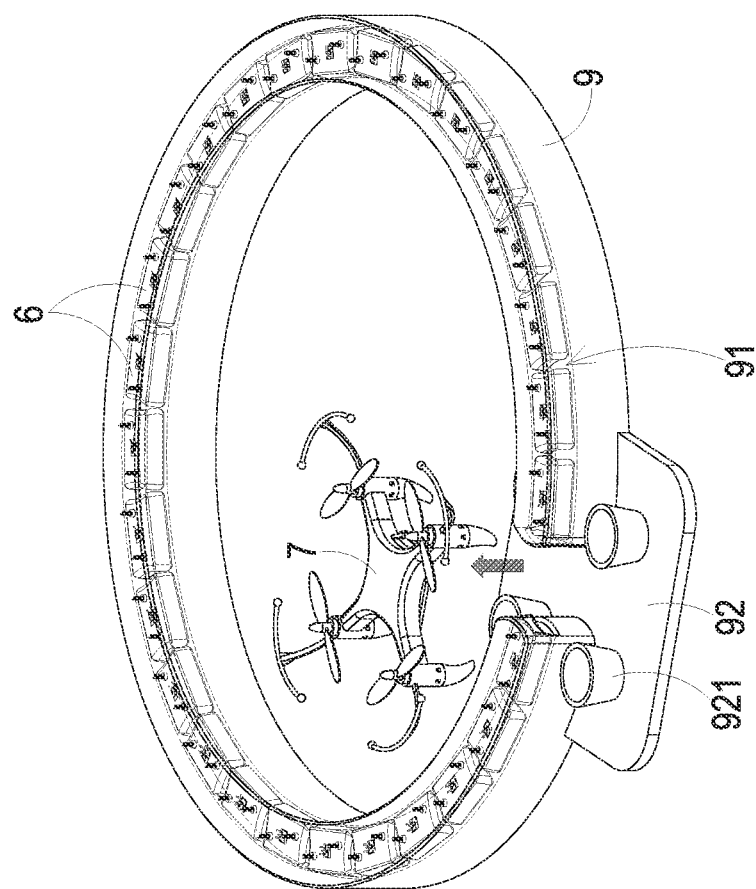
FIG. 12 schematically illustrates a drone of a battery exchange system according to an embodiment of the present invention exiting a battery exchange station.

Please refer to FIGS. 9-12. FIG. 9 schematically illustrates a drone of a battery exchange system according to an embodiment of the present invention landed on a battery exchange station. FIG. 10 schematically illustrates a structure of a battery exchange system according to an embodiment of the present invention. FIG. 11 schematically illustrates a top view of the battery exchange system shown in FIG. 10. FIG. 12 schematically illustrates a drone of a battery exchange system according to an embodiment of the present invention exiting a battery exchange station. According to an embodiment of the present invention, the transportation rail 91 of the battery exchange station 9 and the guide rail 82 of the frame 8 of the drone 7 are engaged as an annular rail. The transportation rail 91 has a plurality of charging slots, and each of the batteries 6 stored in the battery exchange station 9 is disposed in one charging slot of the plurality of charging slots.

When a system of the drone 7 judges that the power of the battery 6 installed in the drone 7 is not enough for the drone 7 to complete the flight mission, the drone 7 will land on the battery exchange station 9 as shown in FIG. 9 for battery exchange. The transportation rail 91 will be engaged with the guide rail 82 and an annular rail will be formed as shown in FIG. 10. Since this structure only provides a unidirectional battery exchange along the first direction d1 and/or the reverse direction of the first direction d1, it can ensure that the battery 6 which is going to be installed on the drone 7 is transported by the transportation rail 91 with passing the whole path of the annular rail, which means the battery 6 is charged for a longest time. Under this structure, the number of the charging slots is preferred to be equal to the number of the batteries 6 stored in the battery exchange station 9, but not limited herein. After the battery exchange is accomplished, the drone 7 exits the battery exchange station 9 as shown in FIG. 12 and returns to execute the flight mission.

Please refer to FIG. 6 and FIG. 9 again. In some embodiments, the battery exchange station 9 further has a platform 92 having a plurality of bases 921. When the drone 7 is landed on the platform 92 of the battery exchange station 9, the plurality of the supporting feet 84 of the frame 8 of the drone 7 are one-to-one disposed in the bases 921, in which a more precise alignment of the drone 7 and the battery exchange station 9 is provided for landing, but not limited herein.

In some embodiments, the battery exchange system 5 of the present invention may include a plurality of battery exchange stations 9, and each of the battery exchange stations 9 can be any one of the embodiments described in the previous paragraphs. If the number of the battery exchange stations 9 is much enough to be widely distributed, the battery exchange system 5 of the drone of the present invention can provide large-area island-hopping flights which can be applied to the long-distance and continuous transportation.

From the above description, the present invention provides a drone and a battery exchange system thereof. By staggering the first positioning component and the second positioning component along the first direction and coupling the first positioning portion and the second positioning portion with the first positioning component and the second positioning component, an automatic exchange of batteries along the first direction can be implemented, and the advantages of reducing costs of space, time, and manpower can be achieved. In addition, through the cooperation of a battery rail penetrating the drone and a positioning mechanism, an automatically unidirectional or bidirectional battery exchange can be implemented. Meanwhile, with drone dispatch systems, island-hopping flights of drones can be implemented, thereby facilitating long-distance and continuous transportation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A drone, comprising:
   a frame having a battery accommodation groove, wherein the battery accommodation groove comprises a first positioning component and a second positioning component, and the first positioning component and the second positioning component are staggered along a first direction; and
   a battery received within the battery accommodation groove, wherein the battery has a first positioning portion and a second positioning portion, the first positioning portion is matched with the first positioning component, and the second positioning portion is matched with the second positioning component, wherein the battery has an electrode region, the electrode region has at least one positive electrode, at least one negative electrode, and at least one identification component, and the positive electrode, the negative electrode, and the identification component are overlapped with each other or separately disposed with each other.

2. The drone according to claim 1, wherein the first positioning portion and the second positioning portion are point-symmetric or line-symmetric with each other relative to a center of the battery.

3. The drone according to claim 1, wherein the frame further has a guide rail, and the guide rail is disposed in the battery accommodation groove along the first direction.

4. The drone according to claim 1, wherein the first positioning component comprises a first spring and a first conical frustum, the second positioning component comprises a second spring and a second conical frustum, each of the first positioning portion and the second positioning portion is a recess, and when the battery is received by the battery accommodation groove, the first spring provides elasticity to make the first conical frustum be received within the first positioning portion and abutted against the first positioning portion, and the second spring provides elasticity to make the second conical frustum be received within the second positioning portion and abutted against the second position portion.

5. The drone according to claim 1, wherein the battery accommodation groove comprises a plurality of metal plate springs, and when the battery is received by the battery accommodation groove, the plate springs are respectively abutted against the positive electrode, the negative electrode, and the identification component.

6. The drone according to claim 1, wherein the battery is changeably received within the battery accommodation groove along the first direction or a reverse direction of the first direction.

* * * * *